United States Patent [19]

Sabri

[11] 4,368,487

[45] Jan. 11, 1983

[54] METHOD AND APPARATUS FOR MITIGATION OF DEGRADATIONS CAUSED BY SPATIO-TEMPORAL FILTERING OF VIDEO SIGNALS

[75] Inventor: Mohamed S. Sabri, Beaconsfield, Canada

[73] Assignee: Northern Telecom Limited, Montreal, Canada

[21] Appl. No.: 234,787

[22] Filed: Feb. 17, 1981

[51] Int. Cl.³ .............................................. H04N 5/14
[52] U.S. Cl. .................................... 358/166; 358/167; 358/133; 358/141
[58] Field of Search ................. 358/167, 166, 133, 141

[56] References Cited

U.S. PATENT DOCUMENTS 3,920,889 11/1975 Connor ................................. 358/166
4,191,970 3/1980 Witsenhausen ...................... 358/167

OTHER PUBLICATIONS

H. Yasuda et al., entitled "Transmitting 4-MHz TV Signals by Combinational Difference Coding", IEEE Transactions on Communications, vol. COM-25, No. 5, May 1977, pp. 508-516.

B. G. Haskell et al., entitled "Interframe Coding of 525-Line, Monochrome Television at 1.5 Mbits/s", IEEE Transactions on Communications, vol. COM-25, No. 11, Nov. 1977, pp. 1339-1348.

H. Kawanishi et al., entitled "An Experimental Inter-multiframe Coder' (1977) Picture Coding Symposium Abstracts, pp. 117-118.

T. Ishiguro et al., entitled "Composite Interframe Coding of NTSC Color Television Signals" National Telecommunications Conference Record, Nov. 1976, p. 6.4.1.

Primary Examiner—Richard Murray
Attorney, Agent, or Firm—Achmed N. Sadik

[57] ABSTRACT

Method and apparatus are provided for mitigating the effects of temporal filtering in a transmitted DPCM encoded video signal wherein the signal is conditioned in the receiver by the inverse temporal filtering function without the disadvantageous use of video frame memory.

17 Claims, 8 Drawing Figures

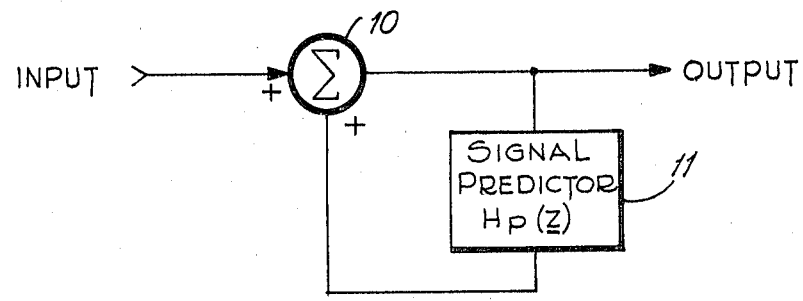
-Fig-1- (PRIOR ART)
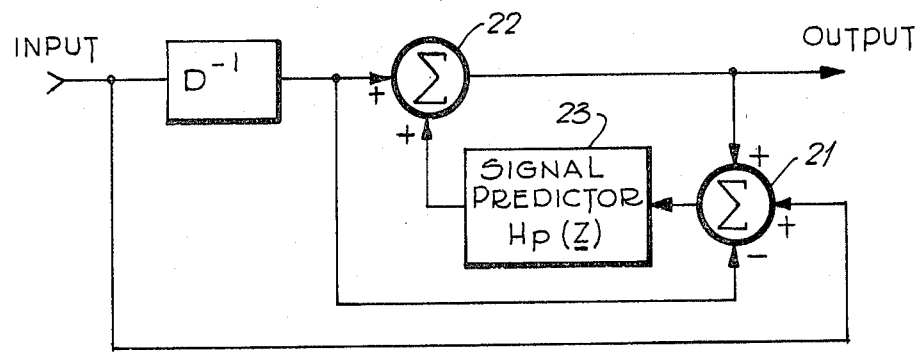
-Fig-2-
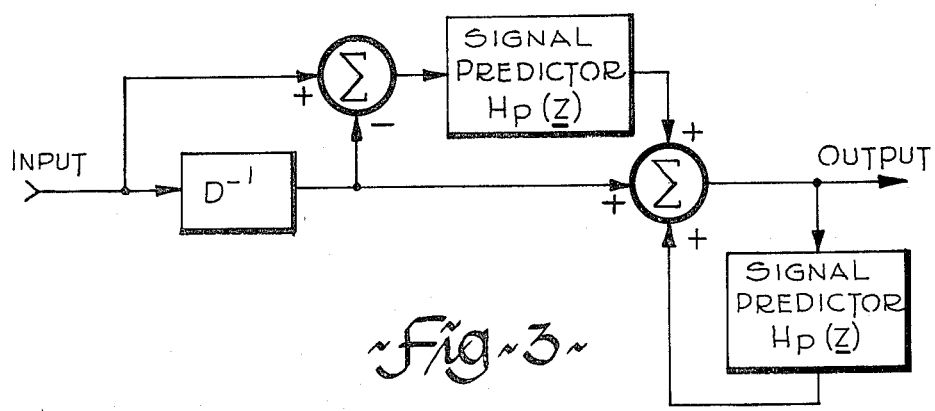
-Fig-3-

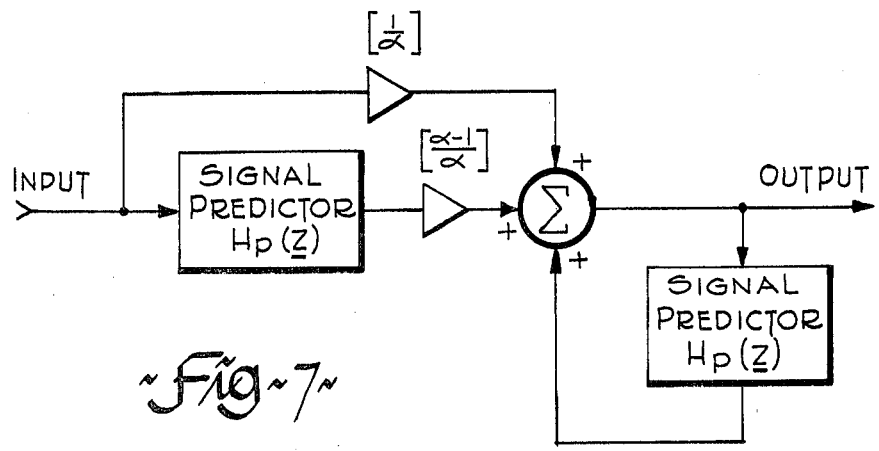
~Fig~7~
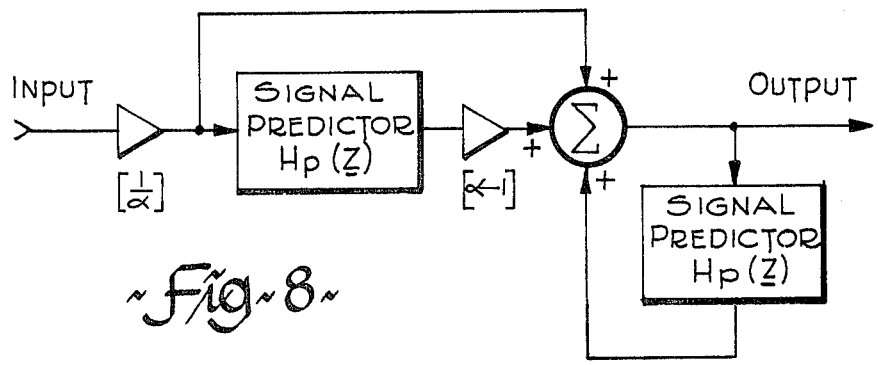
~Fig~8~
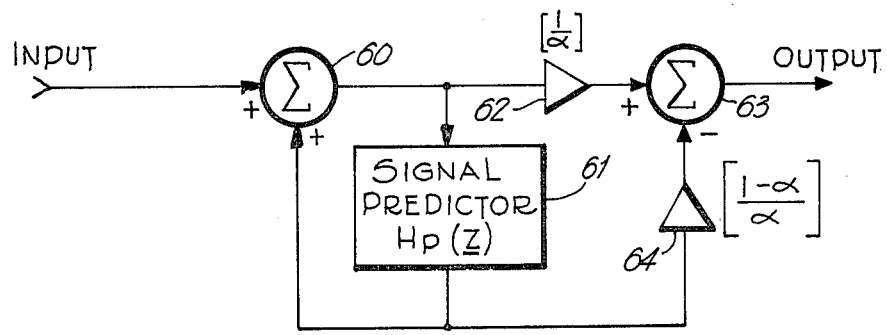
~Fig~6~

METHOD AND APPARATUS FOR MITIGATION OF DEGRADATIONS CAUSED BY SPATIO-TEMPORAL FILTERING OF VIDEO SIGNALS

The present invention relates to method and apparatus for the mitigration of degradations in video pictures caused by spatial, temporal or spatio-temporal filtering, particularly in interframe multimode digital video codecs.

Temporal filtering has been utilized in video codecs as a means of reducing the transmitted bit rate, reducing the effect of aliasing errors, and suppressing noise.

Various types of temporal filtering have been used, for the above mentioned purposes, in the processing of video signals. For instance, H. Yasuda, et al. use a linear temporal filter as an integral part of a differential pulse code modulation (DPCM) transmitter as disclosed in an article entitled "Transmitting 4-MHz TV signals by Combinational Difference Coding", IEEE Transactions on Communications, Vol. COM-25, No. 5, May 1977. In an article entitled "Interframe Coding of 525 Line Monochrome Television at 1.5 Mbits/sec", IEEE Transactions on Communications, Vol. COM-25, No. 11, November 1977, B. G. Haskell, et al., disclose the use of a non-linear element, normally realized by look-up table stored in memory, to process the frame difference signals. In the article by H. Kawaniski, et al. entitled "An Experimental Intermultiframe Coder", (1977) Picture Coding Symposium Abstracts, S10-1, pp. 117-118, a temporal prefilter precedes the DPCM transmitter, the prefilter having a coefficient $\alpha$ which may be fixed or variable.

While such filtering improves the coding performance of the video coders, a certain loss in picture quality is sometimes visible, for instance, with strong non-linear filtering functions placed in the frame difference path. The loss in quality is visible as blurring and tailing in moving objects and/or loss of resolution. It is, therefore, desirable to be able to continue using the technique, but at the same time to reduce the visible degradations resulting therefrom.

D. J. Connor in U.S. Pat. No. 3,920,889, issued Nov. 18, 1975, teaches method and apparatus for enhancing the definition of the moving edges in a television picture. A disadvantage of the Connor technique is that it requires at least one video frame memory.

It is an object of the present invention to reduce the blurring of moving objects in the picture resulting from temporal filtering of the video signals.

A feature of the present invention is that modification is only necessary at the DPCM receiver where the video signals are reconstructed, and none at the DPCM transmitter.

An advantage of the present invention is that additional frame memory is not required.

According to the present invention a method is provided for reconstructing video signals conditioned by a characteristic filtering function including the steps of operating in a predetermined manner on said video signals to predict alternate signals therefrom, and summing said alternate signals and said video signals, characterized by the simultaneous step of conditioning said video signals by the inverse of said characteristic filtering function.

The present invention further provides apparatus, for reconstructing video signals conditioned by a characteristic filtering function, having a summing circuit for at least two variables with an output coupled to signal predicting means the output of which is coupled back to an input of said summing circuit, characterized by an inverse conditioning circuit responsive to said video signals and coupled to an output of said apparatus.

As may be seen from the above defined method and apparatus, the essence of the invention is the provision in the hitherto known video signal reconstructing circuit (which does not necessarily decode the signal) of a conditioning circuit having the inverse characteristic filtering function. That is, if the characteristic filtering function should be a coefficient $\alpha$, as in the paper by Kawaniski, et al, supra, then the inverse function would simply be the coefficient $[1/\alpha]$. The coefficient $[1/\alpha]$ is introduced in a DPCM receiver as a multiplier, which, in the most general implementation, would require the use of a second adding circuit and duplicate signal predicting means. The latter may be somewhat costly, hence other circuit configurations have been devised, which use instead a second multiplier having a coefficient $[\alpha-1]$, or, in yet different configurations, $[(\alpha-1)/\alpha]$. Such circuit configurations are variants of the basic invention. It should also be noted that the term "summing circuit" is used generically to include also a circuit that adds, subtracts, or both.

Embodiments of the present invention will now be described in conjunction with the accompanying drawings, in which:

FIG. 1 is a prior art circuit for generally reconstructing video signals whether or not conditioned by a characteristic filtering function;

FIG. 2 is a circuit for reconstructing video signals conditioned by a characteristic filtering function according to a broad aspect of the present invention;

FIG. 3 is a rearrangement of the circuit of FIG. 2 that requires an additional signal predictor;

FIG. 6 is a linear equivalent of the circuit in FIG. 5;

FIG. 7 is a linear equivalent of the circuits of FIGS. 5 and 6, but less economical in structure;

FIG. 8 is a linear equivalent of the circuit of FIG. 7.

Figure 4:
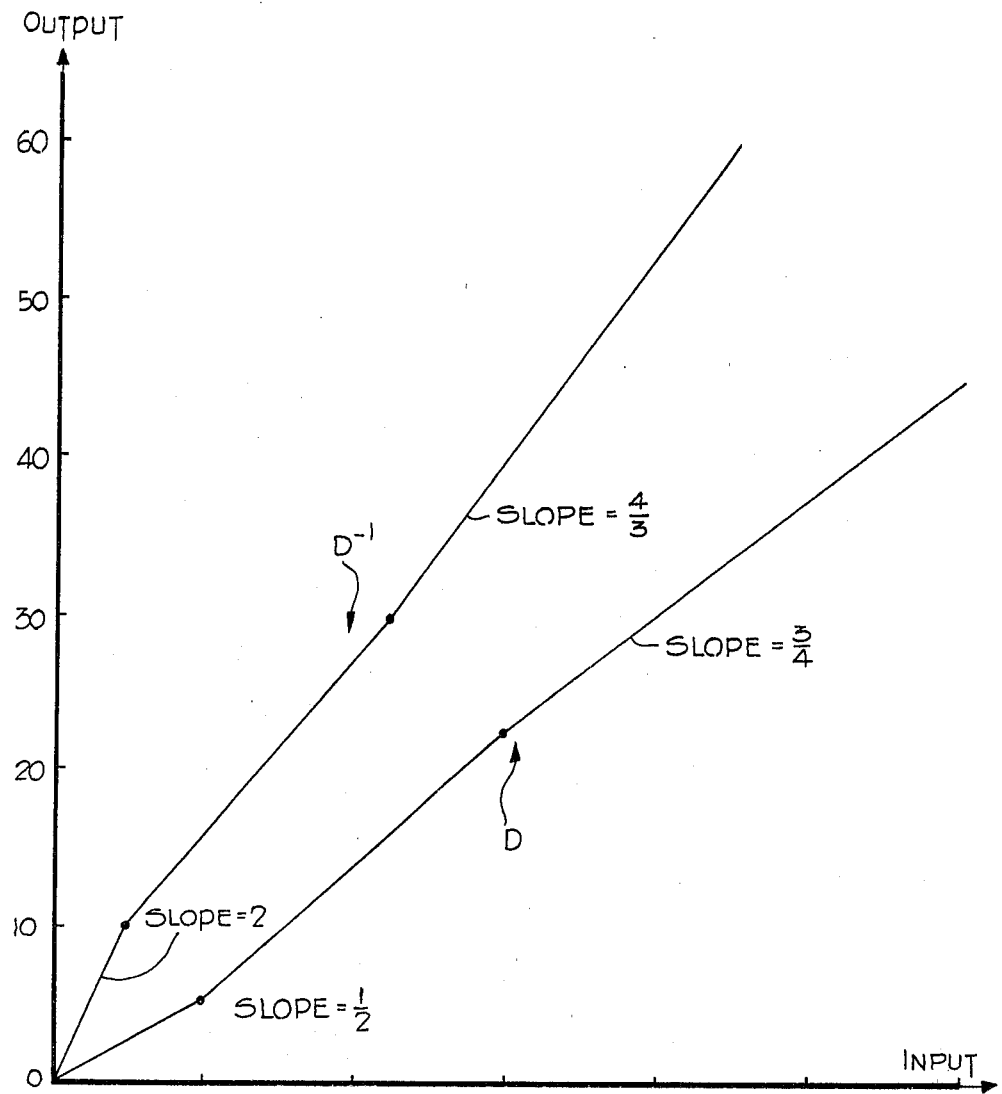
FIG. 4 is a graph showing a typical three segment characteristic filtering function D and its inverse function $D^{-1}$ as required in the reconstructing circuits shown in FIGS. 2 and 3.

The following detailed discussion of the preferred and other embodiments of the present invention is directed specifically to two cases of spatio-temporal filtering in the DPCM transmitter. In one case the characteristic filtering function is linear, and in another non-linear and adaptive. Accordingly, the apparatus or circuit for reconstructing the video signals in the DPCM receiver will vary depending on the type of function employed at the DPCM transmitter. It is not within the scope of this invention to determine which function ought to be used at the DPCM transmitter, which choice would depend on the type of video scene being encoded and transmitted, and on the application under consideration (e.g. conference, broadcast, etc.).

Referring now to the prior art reconstructing apparatus shown in FIG. 1, it comprises a summing circuit 10 for two variables having an output, which is the OUTPUT of the apparatus, and a signal predictor 11 having a transfer function Hp(Z), and which is generally a three-dimensional filter, normally composed of delays, multipliers and adders. The signal predictor 11 must be identical to that employed in the DPCM transmitter. The DPCM video signal generated by the transmitter (generally referred to as the prediction error signal) and relayed to the DPCM receiver site constitutes an input variable to the summing circuit 10, the other input variable thereto being the output of the predictor 11. The output of summing circuit 10 serves as both output of the apparatus and as input to the predictor 11. In such prior art apparatus, whatever spatio-temporal filtering has taken place at the DPCM transmitter, its undesirable effects remain unmitigated.

FIG. 2 shows a block schematic for the case of a general non-linear spatio-temporal filter having the characteristic function D in the DPCM transmitter. The received DPCM video signal is fed into a signal conditioning circuit 20 having the characteristic function $D^{-1}$ and simultaneously to a summing circuit 21, to which also the output of the conditioning circuit 20 is negatively input. The characteristic function $D^{-1}$ is fully defined as the inversion of the function D at the DPCM transmitter. The output of the conditioning circuit 20 is also input to a second summing circuit 22, the output of which is the reconstructed video signal, which is input to the first summing circuit 21. The output of the summing circuit 21 is input to a signal predictor 23 identical to the one employed in the DPCM transmitter, and which output is input to the summing circuit 22.

The characteristic function D of the conditioning filter in the DPCM transmitter may be time varying or space varying, and may exhibit local or global picture dependency. The important thing is, of course, that D, which is simply a relationship between the input and output of the network, be known so that its inverse function $D^{-1}$ may be realized. FIG. 4 shows a typical special case of the function D and its inverse function $D^{-1}$. D and $D^{-1}$ consist of three linear segments having the slopes indicated in the figure. The coordinates in FIG. 4 are in arbitrary units, the abscissa representing the input signal to the conditioning circuit 20 (as well as the input signal to the circuit D in the transmitter) and the ordinate representing the output signal from the circuit 20. Another example of a piecewise non-linear function is shown in FIG. 4 in a paper entitled "Composite Interframe Coding of NTSC Color Television Signals" by T. Ishiguro, et al., published in the National Telecommunications Conference Record, November 1976 at p. 6.4-1. In that same paper, FIG. 3(a) shows a coder or transmitter having a non-linearity (block labelled NL), and FIG. 3(b) shows the decoder or receiver without means for mitigating the effect of the non-linearity NL. The paper by T. Ishiquro, et al., is incorporated herein by reference.

FIG. 3 shows an equivalent circuit to that of FIG. 2, except that this circuit requires a duplicate signal predictor, and is, therefore, less economical. It is shown here only to illustrate the fact that more or less economical variants of a circuit may exist that are fully equivalent as far as the results of processing the incoming video signals are concerned. This fact is, of course, known to those skilled in this art.

Turning now to the most widely used and preferred case, i.e. simple linear temporal filtering in interframe predictive encoding and decoding, a brief theoretical exposition is in order.

The general transfer function $H_{tr}(Z)$ of the transmitter, as is well known, is:

$$H_{tr}(Z) = \alpha[1 - Hp(Z_1, Z_2, Z_3)]/[1 - (1-\alpha)Hp(Z_1, Z_2, Z_3)]$$

where $Z_i = \exp[j\omega_i T_i]$, and $T_1$, $T_2$ and $T_3$ are the sampling intervals of the sampled video signal in the horizontal, vertical, and temporal directions, respectively; Hp(Z) is the transfer function of the predictor; and $\alpha$ is a filtering multiplier which is normally chosen to be less than unity. The overall transmitter-receiver transfer function, without the benefit of the improvement of the present invention, is: $H(Z) = \alpha/[1 - (1-\alpha)Hp(Z)]$; which transfer-function shows the effect of spatio-temporal filtering when using the multiplier $\alpha$ less than unity with a general 3-dimensional predictor Hp(Z). Since the most common case of a previous frame predictor is at hand, the above H(Z) reduces to:

$$H_0(Z_3) = \alpha/[1 - (1-\alpha)Z_3^{-1}];$$

where $Hp(Z_i) = Z_3^{-1}$ has been substituted. The temporal frequency response, i.e. the magnitude and phase responses, is obtained by letting $Z_3 = \exp[j\omega_3 T_3]$, where $1/T_3$ is the frame frequency (30 frames/second in NTSC standard), and $\omega_3$ is the temporal frequency in radians/second. Hence, the magnitude response is:

$$|H(\omega_3)| = \alpha[1 - 2(1-\alpha)\cos\omega_3 T_3 + (1-\alpha)^2]^{\frac{1}{2}};$$

and the phase response is:

$$\Phi(\omega_3) = \tan^{-1}[(1-\alpha)\sin\omega_3 T_3/(1-(1-\alpha)\cos\omega_3 T_3)].$$

The last two equations indicate two types of impairments as a result of temporal filtering at the transmitter. One is the loss of temporal frequency resolution, resulting in blurring and tailing of fast moving objects as already mentioned. The other impairment being phase non-linearity, which causes tailing. Both impairments are mitigated by the apparatus of the present invention.

The transfer function of the prior art receiver as shown in FIG. 1 is:

$$H_r(Z_i) = [1 - Hp(Z_1, Z_2, Z_3)]^{-1};$$

or simply in one dimension with a previous-frame predictor $$H_r(Z_3) = 1/(1 - Z_3^{-1})$$

Now if the receiver transfer function above is cascaded with the inverse of the overall transmitter-receiver transfer function $H(Z_3)$, supra, a new transfer function $H_R(Z_3)$ results for the receiver, or reconstructing apparatus, according to the teaching of the present invention. Thus $$H_R(Z_3) = (1/\alpha)(1 - (1-\alpha)Z_3^{-1})/(1 - Z_3^{-1}).$$

The new overall transmitter-receiver transfer function $H_0(Z_3)$ is, therefore, $$H_0(Z_3) = H_{tr}(Z\omega) \cdot H_R(Z_3) = 1.$$

Which means that, in theory, total compensation or equalization has been achieved. In practice, substantial mitigation of blurring and tailing is achieved.

Figure 5:
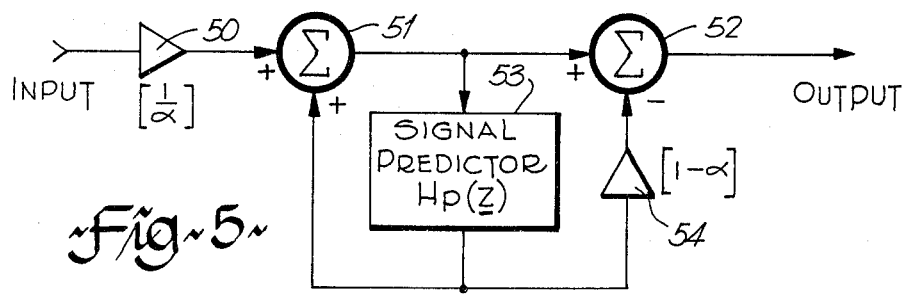
FIG. 5 is a circuit for reconstructing video signals conditioned by a characteristic filtering function equal to a multiplier coefficient $\alpha \leq 1$.

Turning now to FIGS. 5 and 6, the preferred embodiment of the present invention will be described. FIG. 5 is a receiver or reconstructing apparatus for a video signal processed or conditioned by a purely temporal characteristic filtering function, being a multiplier $\alpha$ whose value is less than or equal to unity. The received video signal is input to a multiplier 50 having a multiplication coefficient $[1/\alpha]$ and feeding a first summing circuit 51, the output of which feeds a second summing circuit 52 and a signal predictor 53, the output of which is input to the first summing circuit 51, and to a multiplier 54 having a multiplication coefficient $[1-\alpha]$, which multiplier 54 in turn feeds the second summing circuit 52. The output of the latter is the OUTPUT of the reconstructing apparatus. In the most common and preferred case, the signal predictor 53, being identical to the one utilized at the DPCM transmitter, has a simple transfer function $H_p(Z)$ equal to $[Z_3^{-1}]$, as explained above in the theoretical discussion.

FIG. 6 shows a linearly equivalent variant of the apparatus of FIG. 5. A summing circuit 60 and a signal predictor 61 are interconnected in conventional manner. The output of the summing circuit 60 is fed to the input of a multiplier 62 having a factor equal to $[1/\alpha]$, which feeds a summing circuit 63, while the output of the signal predictor 61 is also applied to a second multiplier 64 having a factor equal to $[(1-\alpha)/\alpha]$, which in turn feeds the summing circuit 63, the output of the latter being the output of the reconstructing circuit.

It will be noticed in FIGS. 5 and 6, that the second summing circuits 52 and 63, respectively, each have one positive and one negative input. An alternative approach, of course, may be to provide the negative coefficients $-[1-\alpha]$ and $-[(1-\alpha)/\alpha]$ to the summing circuits 52 and 63, respectively, instead of providing $+[1-\alpha]$ and $+[(1-\alpha)/\alpha]$. Since all the units shown in the FIGS. 5 and 6 are digital circuits operating on digital pulse encoded signals, such multiplications, additions or subtractions are operations the performance of which is well known in the art of digital signal processing.

While the preferred embodiments of FIGS. 5 and 6 are also economically equivalent, those embodiments shown in FIGS. 7 and 8, while linear equivalents of the former, are not as economical, in that a second, identical predictor is necessary. These circuits are only given here as examples of variants of the basic circuits. Once the foregoing has been understood, they are believed self-explanatory to those skilled in the art.

What is claimed is:

1. A method for reconstructing video signals conditioned by a characteristic filtering function including the steps of operating in a predetermined manner on said video signals to predict alternate signals therefrom, and summing said alternate signals and said video signals, characterized by the simultaneous step of conditioning said video signals by the inverse of said characteristic filtering function.

2. The method of claim 1, further comprising the simultaneous step of summing said video signals after conditioning with said alternate signals.

3. The method of claim 2, further comprising the simultaneous step of subtracting said video signals after said conditioning step from said video signals before said conditioning step.

4. The method of claim 3, further comprising the simultaneous step of predicting alternate signals from the results of said subtracting step.

5. The method of claims 2, 3 or 4, said characteristic filtering function being a multiplication constant $[\alpha]$ less than unity the inverse of which being $[1/\alpha]$.

6. The method of claim 2, said conditioning step being a multiplication by a first constant $[1/\alpha]$ larger than unity, further comprising the simultaneous steps of conditioning said alternate signals by multiplying by a second constant equal to $[1-\alpha]$, and subtracting the results of this multiplying from the results of said summing.

7. The method of claim 1, said step of constant conditioning comprising simultaneously:
(a) multiplying said video signals by a constant factor equal to $[1/\alpha]$, $\alpha$ having said characteristic filtering function;
(b) multiplying said alternate signals by a constant factor equal to $[(1-\alpha)/\alpha]$; and
(c) subtracting the result of (b) from the result of (a) to yield the reconstructed video signals.

8. Apparatus, for reconstructing video signals conditioned by a characteristic filtering function, having a summing circuit for at least two variables with an output coupled to signal predicting means the output of which is coupled back to an input of said summing circuit, characterized by an inverse conditioning circuit responsive to said video signals and coupled to an output of said apparatus.

9. The apparatus of claim 8, said inverse conditioning circuit being a circuit having the inverse of said characteristic filtering function as its transfer function.

10. The apparatus of claim 9, said inverse conditioning circuit being coupled to the output of said apparatus by having its output connected to an input of said summing circuit.

11. The apparatus of claim 10, the output of said summing circuit being the output of said apparatus.

12. The apparatus of claim 9, the inverse of said characteristic filtering function being a multiplying factor equal to $[1/60]$, where $\alpha$ is the characteristic filtering function and is a constant smaller than unity.

13. The apparatus of claim 12, said inverse conditioning circuit being interposed between said video signals and an input of said summing circuit.

14. The apparatus of claim 13, having another summing circuit receiving the output of said summing circuit at one input and receiving the output of said signal predicting means multiplied by a factor equal to $[1-\alpha]$ at another input, said another input being subtracted from said one input.

15. The apparatus of claim 9, said inverse conditioning circuit comprising a first multiplying circuit responsive to the output of said summing circuit and coupled with its output to another summing circuit the other input of which receives the output of a second multiplying circuit responsive to the output of said signal predicting means, the output of said another summing circuit being the output of said apparatus.

16. The apparatus of claim 15, said first multiplying circuit being a multiplication factor equal to $[1/\alpha]$, $\alpha$ being said characteristic filtering function, and said second multiplying circuit being a multiplication factor equal to $-[(1-\alpha)/\alpha]$.

17. The apparatus of claim 16, said characteristic filtering function $\alpha$ being a constant less than unity.

* * * * *